US006684204B1

(12) United States Patent  
Lal (10) Patent No.: US 6,684,204 B1
(45) Date of Patent: Jan. 27, 2004

(54) METHOD FOR CONDUCTING A SEARCH ON A NETWORK WHICH INCLUDES DOCUMENTS HAVING A PLURALITY OF TAGS

(75) Inventor: Amrish K. Lal, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 275 days.

(21) Appl. No.: 09/596,821

(22) Filed: Jun. 19, 2000

(51) Int. Cl.$^7$ .............................................. G06F 17/30
(52) U.S. Cl. .............................................. 707/3; 707/1
(58) Field of Search ............................. 707/104.1, 7, 3, 707/5, 200, 1

(56) References Cited

U.S. PATENT DOCUMENTS

| | | | |
|---|---|---|---|
| 5,920,854 A | 7/1999 | Kirsch et al. | 707/3 |
| 6,012,098 A | 1/2000 | Bayeh et al. | 709/246 |
| 6,088,675 A * | 7/2000 | MacKenty et al. | 704/260 |
| 6,263,332 B1 * | 7/2001 | Nasr et al. | 707/5 |
| 6,266,682 B1 * | 7/2001 | LaMarca et al. | 707/5 |
| 6,292,880 B1 * | 9/2001 | Mattis et al. | 707/7 |
| 6,360,215 B1 * | 3/2002 | Judd et al. | 382/190 |
| 6,366,934 B1 * | 4/2002 | Cheng et al. | 707/200 |
| 6,377,946 B1 * | 4/2002 | Okamoto et al. | 707/2 |
| 6,385,583 B1 * | 5/2002 | Ladd et al. | 704/270 |
| 6,505,191 B1 * | 1/2003 | Baclawski | 707/3 |

OTHER PUBLICATIONS

Liu, et al., "Am XML–based Wrapper Generator for Web Information Extraction," Oregon Graduate Institute of Science and Technology, 1999, pp. 540–543.
McHugh, et al., "Lore: A Database Management System for Semistructured Data," Stanford University.
Shin, et al., "BUS: An Effective Indexing and Retrieval Scheme in Structured Documents," Department of Computer Engineering, Chungnam National University, Korea, 1998.
"GMD–IPSI XQL Engine, Version 1.0.2," GMD, 1999.
"XML–QL: A Query Language for XML," World Wide Web Consortium, Aug. 19, 1998.

* cited by examiner

Primary Examiner—Safet Metjahic
Assistant Examiner—Cam Linh Nguyen
(74) Attorney, Agent, or Firm—Sawyer Law Group LLP (57) ABSTRACT

A method and system for conducting a search on a network is disclosed. The network has a plurality of sites. One or more of the sites has a plurality of documents wherein at least one of the documents comprises a plurality of tags. The method and system comprises identifying at least one of the plurality of tags, receiving a query, parsing the query, and matching the parsed query with at least one of the plurality of tags of the at least one of the plurality of documents. Accordingly, through the use of a method and system in accordance with the present invention, the extraction of information from networks comprising XML documents is done in a more precise fashion.

14 Claims, 12 Drawing Sheets

Architecture of XML search engine

FIG. 1
(PRIOR ART)

| pine mountain lake | search |

- About Pine Mountain Lake — 22
  http://www.pinemountainlake.com/about4.html
- Realty World – Pine Mountain Lake Realty
  http://www.pmlr.com/ — 24
- About Pine Mountain Lake
  http://www.pinemountainlake.com/about.html
- Pine Mountain Lake Campground
  http://www.pinemountainlake.com/camp.html
- Pine Mountain Lake Airport
  http://www.pinemountainlake.com/airport.html
- Where is Pine Mountain Lake
  http://www.pmlr.com/sec3.htm
- Pine Mountain Lake Equestrian Center
  http://www.pinemountainlake.com/equestrian.html
- Realty World Pine Mountain Lake Realty – Waterfront
  http://www.pmlr.com/water.htm
- Pine Mountain Lake
  http://www.pmlr.com/sec2.htm
- Pine Mountain Lake – California Online Highways
  http://www.caohwy.com/p/pinemlak.htm
- Realty World Pine Mountain Lake Realty Golf Course Home w/ Lake View
  http://www.pmlr.com/u5198.htm
- Realty World Pine Mountain Lake Realty – Double your Pleasure
  http://www.pmlr.com/u71128.htm
- Realty World Pine Mountain Lake Realty – Attention Pilots
  http://www.pmlr.com/u12154.htm
- Realty World Pine Mountain Lake Realty –1 112
  http://www.pmlr.com/1_112.htm
- Realty World Pine Mountain Lake Realty –8 70
  http://www.pmlr.com/8_70.htm
- Realty World Pine Mountain Lake Realty –2 131
  http://www.pmlr.com/2_131.htm
- Realty World Pine Mountain Lake Realty –1 261
  http://www.pmlr.com/1_261.htm
- Realty World Pine Mountain Lake Realty –5 166
  http://www.pmlr.com/5_166.htm
- Realty World Pine Mountain Lake Realty –15 121
  http://www.pmlr.com/15_121.htm
- Realty World Pine Mountain Lake Realty –1 138
  http://www.pmlr.com/1_138.htm
- Realty World Pine Mountain Lake Realty –4 582
  http://www.pmlr.com/4_582.htm
- Realty World Pine Mountain Lake Realty –4 310
  http://www.pmlr.com/–4 310.htm << back - next >>

FIG. 2 (PRIOR ART)

```xml
<?xml version="1.0"?>
<!DOCTYPE BOOKSTORE SYSTEM "bookstore.dtd">
<-- Amazon bookstore inventory-->
<BOOKSTORE ID = "3245">
    <NAME>The Big Book</NAME>
    <ADDRESS>
        <STREET>701 Curtner Avenue</STREET>
        <CITY>San Jose</CITY>
        <STATE>CA</STATE>
        <ZIP>95120</ZIP>
    </ADDRESS>
    <PHONE>
        <AREA_CODE>408</AREA_CODE>
        <LOCAL_NUMBER>345-1236</LOCAL_NUMBER>
    </PHONE>
    <FAX>
        <AREA_CODE>408</AREA_CODE>
        <LOCAL_NUMBER>345-1367</LOCAL_NUMBER>
    </FAX>
    <EMAIL>
        <EMAIL_PREFIX>info</EMAIL_PREFIX>
        <INTERNET_DOMAIN_NAME>bigbook</INTERNET_DOMAIN_NAME>
        <INTERNET_DOMAIN_NAME_XTENSION>com</INTERNET_DOMAIN_NAME_XTENSION>
    </EMAIL>
    <WEB>http://www.bigbook.com</WEB>
    <BOOKS>
        <BOOK ID="1-57521-334-6">
            <ISBN>1-57521-334-6</ISBN>
            <TITLE>Presenting XML</TITLE>
            <AUTHOR>Richard Light</AUTHOR>
            <SUBJECT>Internet</SUBJECT>
            <PUBLISHER>McMillan</PUBLISHER>
            <YEAR>1997</YEAR>
            <PRICE>24.99</PRICE>
        </BOOK>
        <BOOK ID = "1-56592-194-1">
            <ISBN>1-56592-194-1</ISBN>
            <TITLE>Java Virtual Machine</TITLE>
            <AUTHOR>Jon Meyer</AUTHOR>
            <AUTHOR>Troy Downing</AUTHOR>
            <SUBJECT>Programming</SUBJECT>
            <PUBLISHER>O' Reilly</PUBLISHER>
            <YEAR>1997</YEAR>
            <PRICE>32.95</PRICE>
        </BOOK>
    </BOOKS>
</BOOKSTORE>
```

An XML document

FIG. 3

```
<BOOK>
        <TITLE>Presenting XML</TITLE>
        <AUTHOR>Richard Light</AUTHOR>
        <SUBJECT>Internet</SUBJECT>
        <PUBLISHER>Sams.net</PUBLISHER>
        <PRICE>24.98</PRICE>
</BOOK>
```

An XML element

FIG. 4

```
<?xml encoding="US-ASCII"?>

<!-- root element -->
<! ELEMENT BOOKSTORE (NAME,ADDRESS,PHONE+,FAX+,EMAIL+,WEB+,BOOKS)>
<! ATTLIST BOOKSTORE
     ID CDATA #REQUIRED>

<!-- child elements of BOOKSTORE -->
<! ELEMENT NAME (#PCDATA)>
<! ELEMENT ADDRESS (STREET?,APT?,CITY?,STATE?,ZIP?)>
<! ELEMENT PHONE (AREA_CODE,LOCAL_NUMBER)?>
<! ELEMENT FAX (AREA_CODE,LOCAL_NUMBER)?>
<! ELEMENT EMAIL
(EMAIL_PREFIX,INTERNET_DOMAIN_NAME,INTERNET_DOMAIN_NAME_XTENSION,INTERNET_COUNTRY_
CODE?)>
<! ELEMENT WEB (#PCDATA)>
<! ELEMENT BOOKS (BOOK)*>

<!-- child elements of ADDRESS -->
<! ELEMENT STREET (#PCDATA)>
<! ELEMENT APT (#PCDATA)>
<! ELEMENT CITY (#PCDATA)>
<! ELEMENT STATE (#PCDATA)>
<! ELEMENT ZIP (#PCDATA)>

<!-- child element of PHONE/FAX -->
<! ELEMENT AREA_CODE (#PCDATA)>
<! ELEMENT LOCAL_NUMBER (#PCDATA)>

<!-- child element of EMAIL -->
<! ELEMENT EMAIL_PREFIX (#PCDATA)>
<! ELEMENT INTERNET_DOMAIN_NAME (#PCDATA)>
<! ELEMENT INTERNET_DOMAIN_XTENSION (#PCDATA)>
<! ELEMENT INTERNET_COUNTRY_CODE (#PCDATA)>

<!-- child element of BOOKS -->
<! ELEMENT BOOK (ISBN,TITLE,AUTHOR*,SUBJECT,PUBLISHER,YEAR,PRICE)>
<! ATTLIST BOOK
     ID CDATA #REQUIRED>

<!-- child elements of BOOK -->
<! ELEMENT ISBN (#PCDATA)>
<! ELEMENT TITLE (#PCDATA)>
<! ELEMENT AUTHOR (#PCDATA)>
<! ELEMENT SUBJECT (#PCDATA)>
<! ELEMENT PUBLISHER (#PCDATA)>
<! ELEMENT YEAR (#PCDATA)>
<! ELEMENT PRICE (#PCDATA)>
```

FIG. 5  A Document Type Definition

FIG. 6

FIG. 7  Architecture of XML search engine

FIG. 8   115

A hash-table index

A tree index

METHOD FOR CONDUCTING A SEARCH ON A NETWORK WHICH INCLUDES DOCUMENTS HAVING A PLURALITY OF TAGS

FIELD OF INVENTION

The present invention relates generally to searching a network and particularly to searching a network which includes documents that have a plurality of tags.

BACKGROUND OF THE INVENTION

Figure 1:
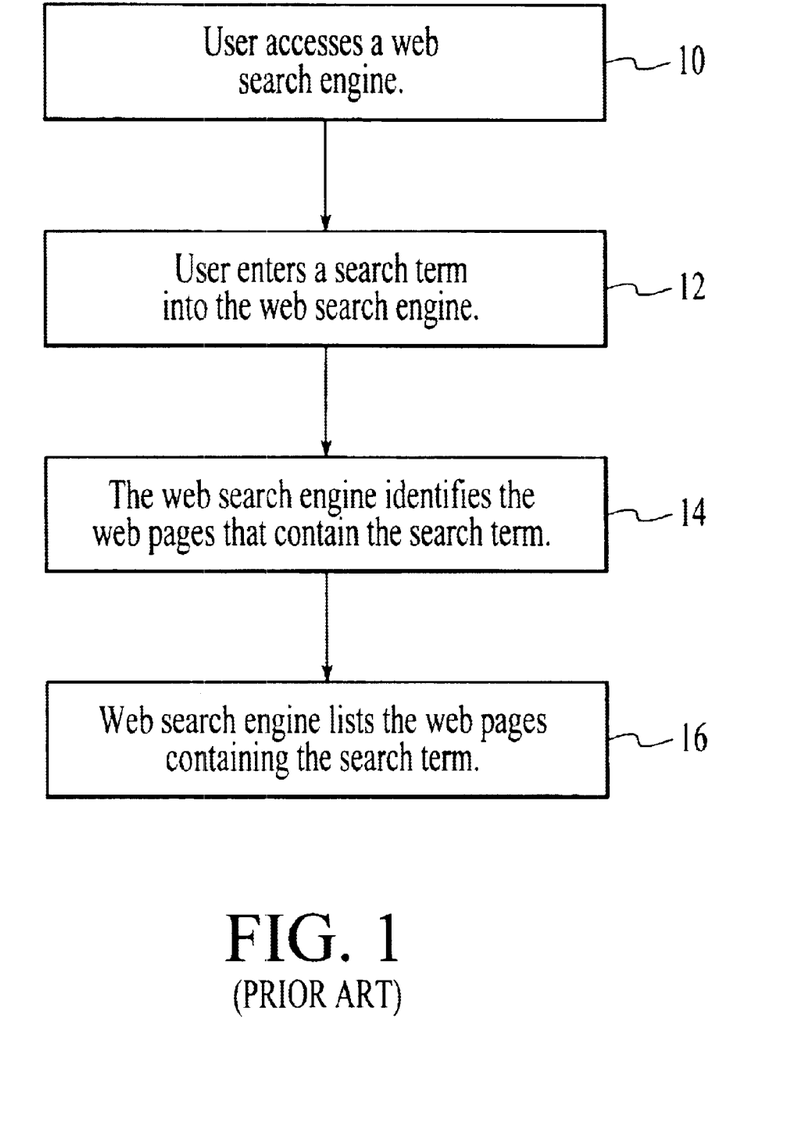
FIG. 1 shows a flowchart of a conventional web search.

Computer networking systems such as the Internet are exploding in popularity all over the world. There are many reasons for this phenomenal growth, not the least of which is the ability to discover and access needed information in an efficient manner. The power of the Internet enables the average person with very little technical training to search for information in minutes instead of days, weeks, or even months of searching libraries, telephone books, directories or other conventional research means. To better understand conventional Internet search technology, refer now to FIG. 1. FIG. 1 represents a flowchart of how an Internet user performs a conventional web search.

First, the Internet user accesses a web search engine, via step 10. Next, the Internet user enters a search term(s) into the web search engine, via step 12. The web search engine then identifies the web pages that contain the search term(s), via step 14. Finally, the web pages containing the search term(s) are listed by the search engine, via step 16.

However, as more and more information comes online, at accelerating rates, today's search engine interfaces and features are not keeping pace. Searches that would have previously produced less than a dozen relevant documents are now producing hundreds of documents. This is making it very difficult and time consuming for the Internet user to evaluate and investigate the results. More sophisticated searches, sometimes beyond the grasp of a non-professional researcher, are not always the answer as the narrower searches introduce greater risk of eliminating relevant and useful information. The severity of this problem is growing day by day at an ever-increasing rate.

One of the circumstances greatly exacerbating this problem is the tendency of web page developers to add large numbers of keywords to each and every page of their web site as a strategy to boost their standings with the Internet search engines. Thus, a single web site, which an Internet user may decide is not relevant after accessing the web site home page, may produce dozens or even hundreds of result pages listed in the search results. FIG. 2 shows a typical web search results list. The search term(s) 20 appears on multiple web pages of the "www.pinemountainlake.com" 22 and "www.pmlr.com" 24 web sites. Even with enhanced bandwidth and greater network speeds, wading through hundreds of these "hits" to move to the next interesting web site is inefficient, cumbersome and annoying. An Internet user may actually lose patience after viewing dozens of pages of results with redundant information and terminate his search prematurely missing the relevant page buried deep down in the list.

However, the Standard Generalized Markup Language (SGML) working group of the W3 Consortium has proposed a new standard, called XML (extensible Markup Language) which is a subset of SGML. The goal of XML is to provide many of SGML's benefits that are currently not available with current HTML (Hypertext Markup Language).

Figure 4:
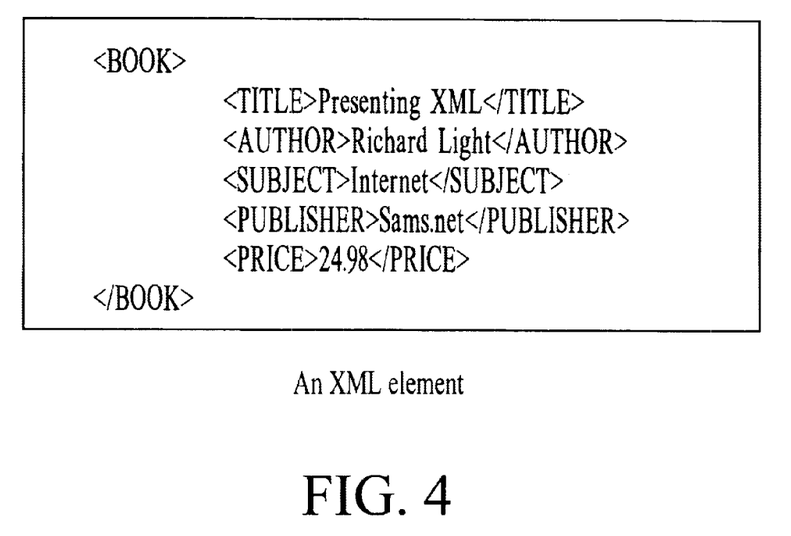
FIG. 4 illustrates the tag structure associated with a book entitled "Presenting XML".

One of XML's benefits is its simplicity. FIG. 3 shows a typical XML document. An XML document is a sequence of tags. Data along with the associated tag is referred to as an element. For example, a book has a title, an author, a publisher, and a price. FIG. 4 accordingly illustrates the tag structure associated with a book entitled "Presenting XML".

The only restriction is that tag elements must match, e.g. each <ADDRESS> must have a matching </ADDRESS>, and must nest properly. An XML Document that has matching and properly nested tags is called well-formed. The elements in XML loosely correspond to objects in object oriented or object-relational databases. For example, a <PERSON> . . .</PERSON> would correspond to an object of type class PERSON{. . . }. Nested XML elements correspond to an object's fields, e.g., <NAME>, <PHONE> and <ADDRESS> elements in <PERSON> would correspond to the name, phone, and address fields of a PERSON object.

This simplicity allows users to produce XML data with complex structure without having to first define a schema. It can be useful, however, to have some specification of XML data's structure, especially for a user community to define its own ontology for data exchange. In this case DTDs (Document Type Definitions) can be used to specify the data's known structure. FIG. 5 shows a typical DTD schema. While DTDs are similar to schemas in object-oriented or object-relational databases, they are less restrictive and permit more variation in the data. For example, DTDs can specify that some fields are optional and that others may occur multiple times, and DTDs do not require that the type of a reference be specified.

Given its flexibility, it is likely that XML will facilitate the exchange of huge amounts of data on the Web. Dozens of application of XML already exist, including a Chemical Markup Language for exchanging data about molecules and the Open Financial Exchange for exchanging financial data between banks or banks and customers. Based on the availability of huge amounts of XML data, one is faced with a problem when the need arises to extract data from these documents. The problem is that conventional search engines, although equipped to search HTML documents, are not able to effectively search XML documents. This is due to the fact that conventional search engines aren't equipped to handle documents comprising the element tags that the XML format utilizes.

Accordingly, what is needed is an effective method for searching XML documents. The method should be simple, cost effective and capable of being easily adapted into existing technology. The present invention addresses such a need.

SUMMARY OF THE INVENTION

A method and system for conducting a search on a network is disclosed. The network has a plurality of sites. One or more of the sites has a plurality of documents wherein at least one of the documents comprises a plurality of tags. The method and system comprises identifying at least one of the plurality of tags, receiving a query, parsing the query, and matching the parsed query with at least one of the plurality of tags of the at least one of the plurality of documents.

Accordingly, through the use of a method and system in accordance with the present invention, the extraction of information from networks comprising XML documents is done in a more precise fashion.

BRIEF DESCRIPTION OF THE DRAWINGS

FIG. 2 shows a typical web search results list.

FIG. 3 shows a typical XML document.

FIG. 5 shows a typical DTD schema.

DETAILED DESCRIPTION OF THE INVENTION

The present invention provides a method and system for conducting a search on a network. The following description is presented to enable one of ordinary skill in the art to make and use the invention and is provided in the context of a patent application and its requirements. Although the present invention has been described in the context of being used with the Internet, one of ordinary skill in the art will readily recognize that the present system can be used in conjunction with any type of networking system while remaining within the spirit and scope of the present invention. Accordingly, various modifications to the preferred embodiment will be readily apparent to those skilled in the art and the generic principles herein may be applied to other embodiments. Thus, the present invention is not intended to be limited to the embodiments shown but is to be accorded the widest scope consistent with the principles and features described herein.

Figure 6:
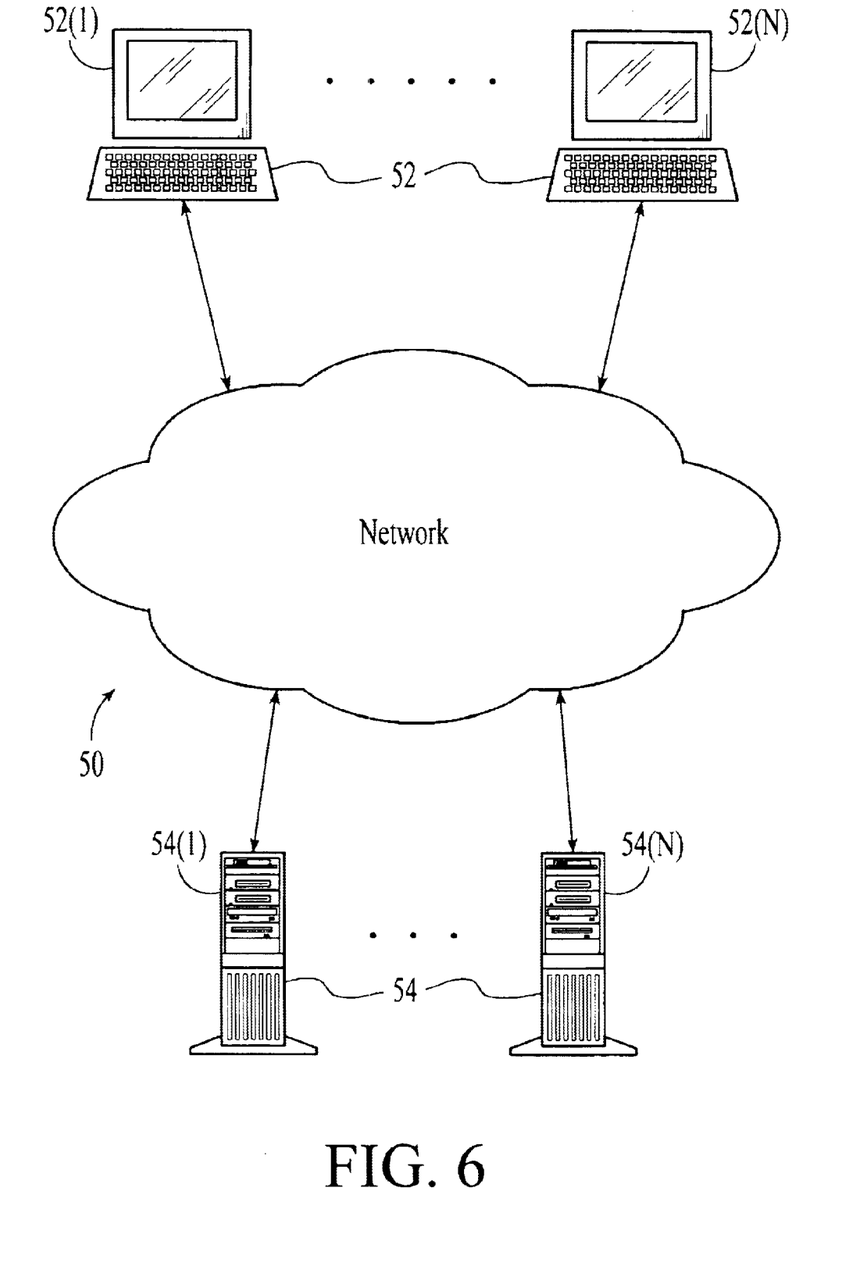
FIG. 6 illustrates an example of an overall environment in which the method and system in accordance with the present invention may be used.

FIG. 6 illustrates an example of an overall environment in which the method and system in accordance with the present invention may be used. This environment includes a network 50, such as the Internet, that is connected to a plurality of computers 52, each of the plurality of computers including a display device for displaying information. Also connected to the network 50 is a plurality of information servers 54 that provide information to the network 50.

The present invention is disclosed in the context of a preferred embodiment. The preferred embodiment of the present invention provides for a search engine for extracting data from XML documents. Through the use of the method and system in accordance with the present invention, context and comparative searches can be effectively accomplished in an XML document-oriented environment.

Although the preferred embodiment of the method and system in accordance with the present invention contemplates being utilized in conjunction with XML documents, one of ordinary skill in the art will readily recognize that the present invention could be implemented in conjunction with any type of document that employs a tag-type methodology to identify information while remaining within the spirit and scope of the present invention.

Preferably, the search engine in accordance with the present invention is provided to the computers 52 via the network 50 utilizing a universal programming language. An example of a universal programming language is JAVA. JAVA is a programming language designed primarily for writing software on Internet Web Sites that are downloadable over the Internet to a consumer computer. Furthermore, by using JAVA, a small application (called an applet) can be relayed to a consumer computer for the purpose of performing specific task(s) on the consumer computer.

Although the preferred embodiment of the method and system in accordance with the present invention contemplates using the JAVA programming language, one of ordinary skill in the art will readily recognize that a variety of programming languages could be utilized while remaining within the spirit and scope of the present invention.

In order to facilitate the effective implementation of the preferred embodiment of the present invention, each discipline within the networking industry should preferably set up its own standardized DTD structure. From art to e-commerce to zoology, disciplines should preferably agree on the appropriate structures for their various documents. Already mathematicians, chemists, genealogists and real-estate brokers have set up standard formats for their documents.

Although the preferred embodiment of the method and system in accordance with the present invention contemplates using a DTD schema, one of ordinary skill in the art will readily recognize that a variety of schemas, such as Document Content Definition (DCD) could be utilized while remaining within the spirit and scope of the present invention.

Also, search engine indexing applications should preferably hold the tag information as metadata. Metadata is information about information. Structural metadata refers to tags within the document. For example, an <author> tag tells us that the data within the tag will be an author's name. However, this might be the author of a book described in the document the author of a movie review, and so on. This metadata can also be searched, if the indexing application can recognize and store it correctly.

In addition to basic tags, the indexes should preferably store the entire hierarchy, so that a searcher can specify the right tag ever when the tag names are reused in a structure. For example, a job-listing document might have a <location> tag for the company headquarters, a different <location> tag for the job site, and yet another <location> tag for the headhunter's office. Obviously, these are very different and should be searched separately.

Figure 7:
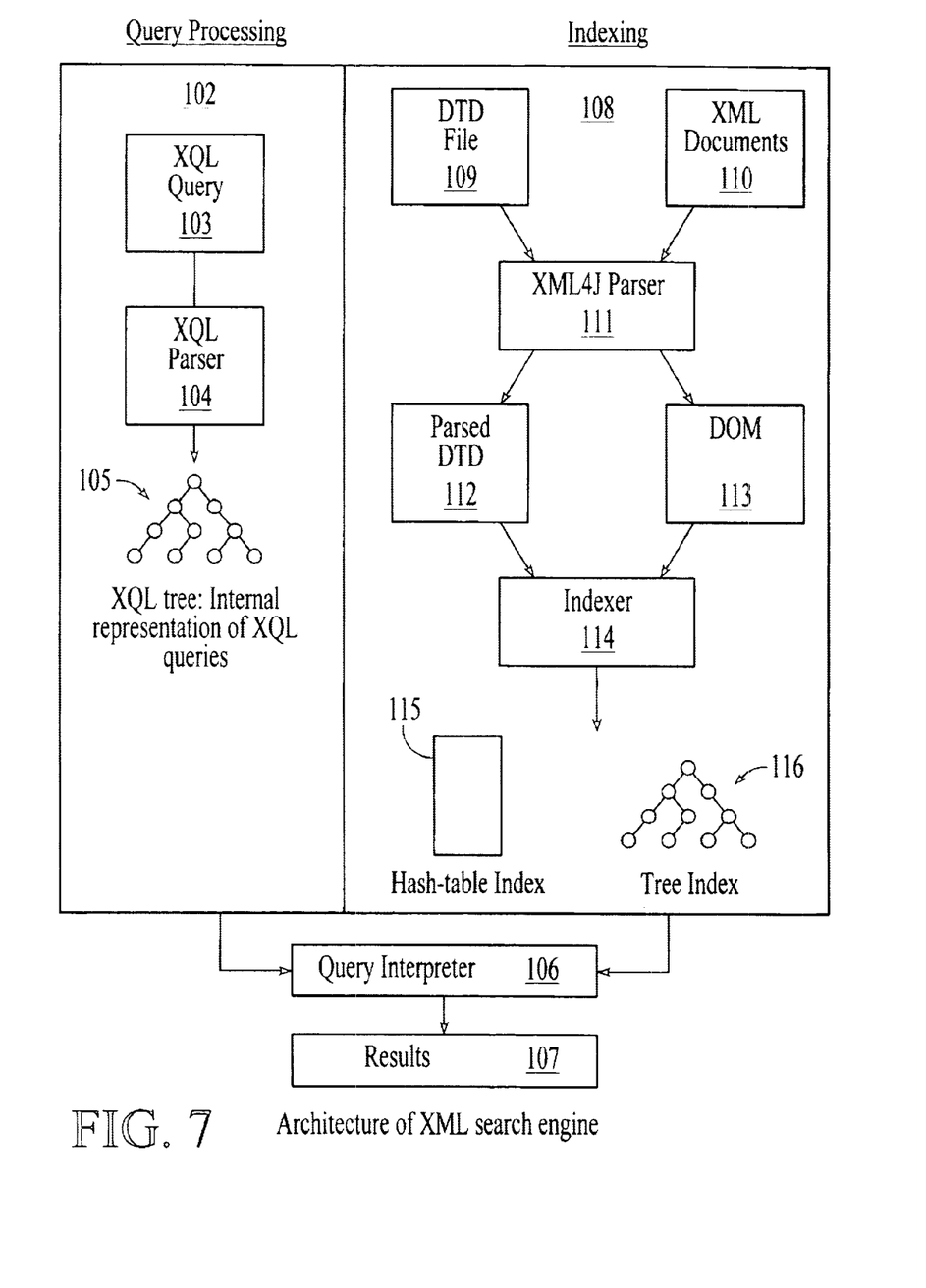
FIG. 7 is an illustration of the system in accordance with the present invention.

To better understand the system in accordance with the present invention, please refer now to FIG. 7. FIG. 7 is an illustration of the system in accordance with the present invention. The shaded areas of the FIGURE show the input, the output, and the data structures used in the search engine, while the non-shaded areas show software components of the system. Two main activities that the search engine carries out are query processing and indexing. Accordingly, the system comprises a query processing portion 102, a query interpreter 106, and an indexing portion 108.

The query processing portion 102 comprises an XML Query Language (XQL) Query 103, an XQL parser 104, and an XQL tree 105. The XQL Query 103 is the string representation of the query entered by the user. The XQL parser 104 is used to convert a string representation of an XQL query into a XQL tree 105 data structure. The XQL tree 105 is the internal representation of XQL queries.

The indexing portion 108 comprises a DTD file 109, XML documents 110, an XML4J parser 111, parsed DTD 112, DOM 113, and indexer 114, a hash table index 115 and a tree index 116. The DTD file 109 is the file that contains the Document Type Definition. XML documents 110 represent one or more XML files. The XML4J parser 111 is used to obtain a DOM representation of an XML file 110 and parse the DTD file 109. Parsed DTD 112 is the parsed form of DTD produced by the XML4J parser 111. DOM 113 is the Document Model Object representation of the various XML files used by the search engine. The indexer 114 is used to create two indices for each XML file 110, a hash-table index 115 and a tree index 116.

The hash-table index 115 and the tree index 116 are the two indices used to access DOM elements in a DOM representation of an XML document. Both the hash-table and the tree index have pointers to XML elements present in the DOM representation. These pointers can be used to quickly access the result elements that correspond to a user-entered XQL query.

Figure 8:
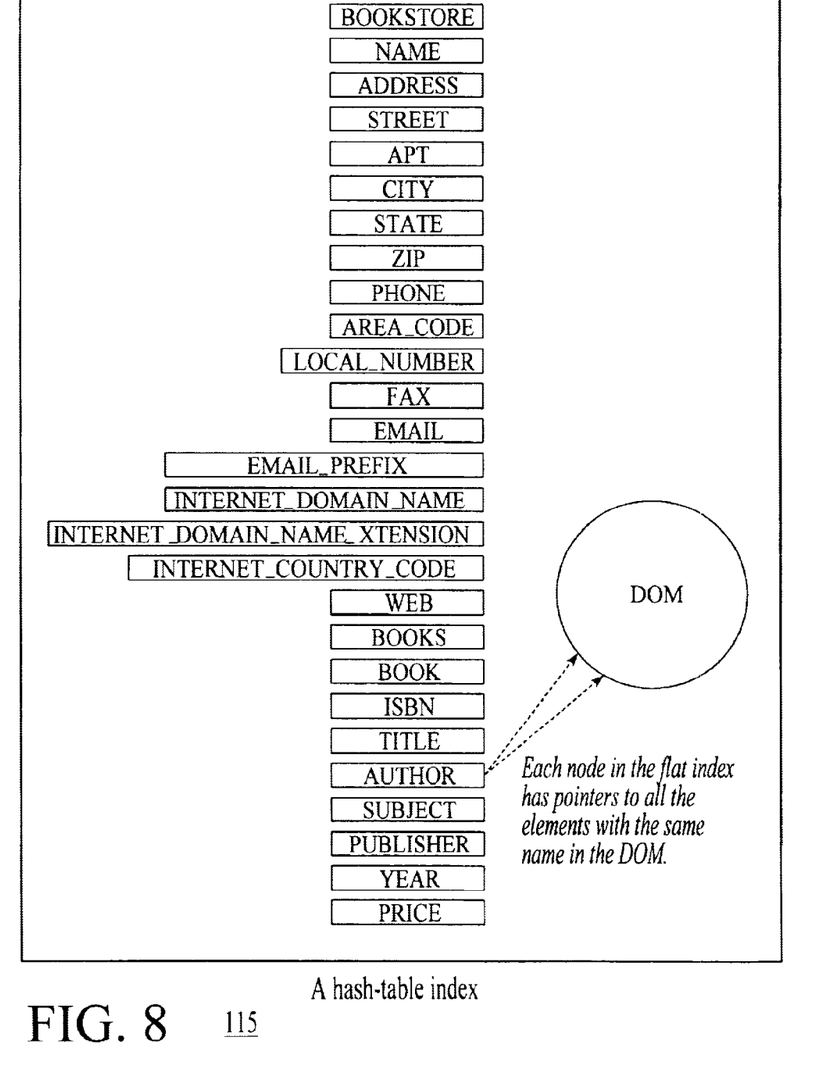
FIG. 8 shows an example of a hash table index.
Figure 9:
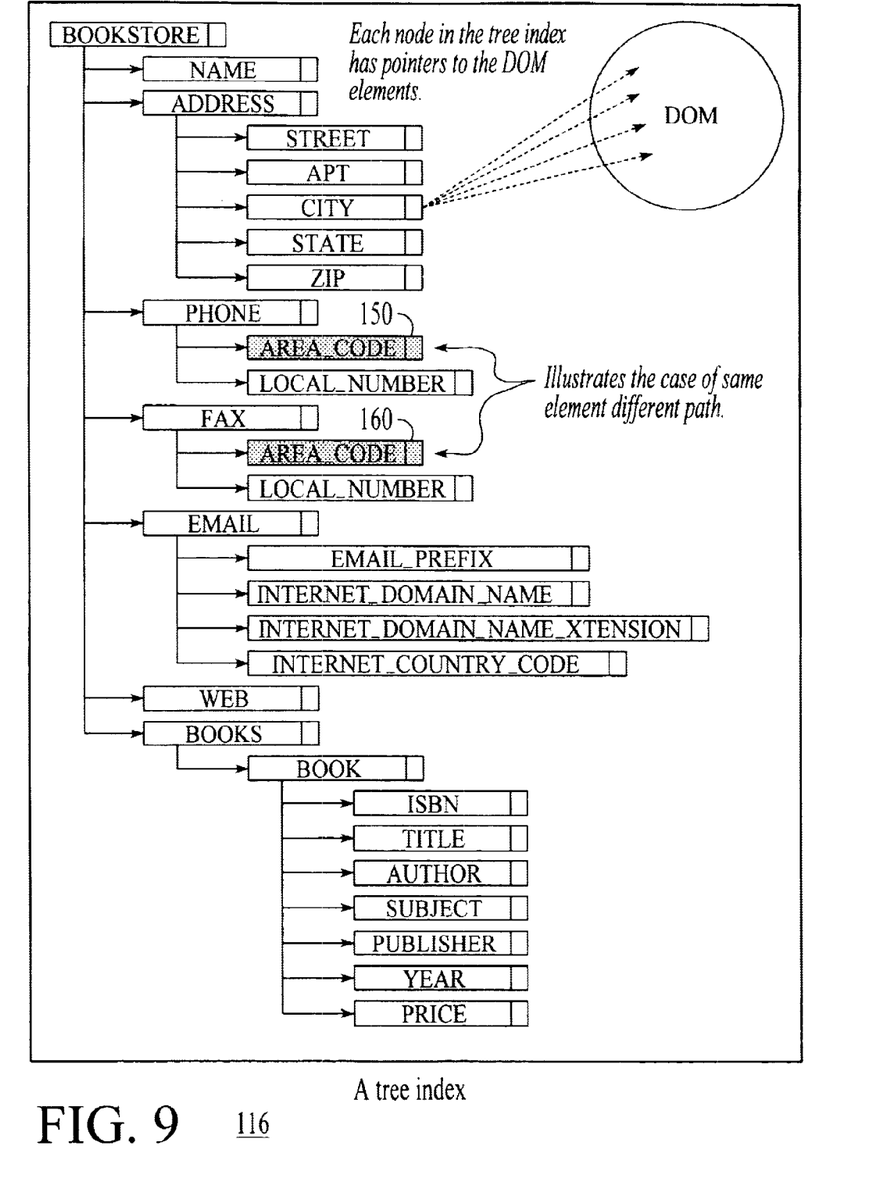
FIG. 9 shows an example of a tree index.

For a more detailed description of the hash-table index 115 and the tree index 116, please refer to FIGS. 8 and 9. FIG. 8 shows an example of a hash table index 115 and FIG. 9 shows an example of a tree index 116. The hash table index 115 contains the names of tags that occur in an XML document. The value of the hash-table index 115 contains an array of pointers. These pointers point to the DOM elements corresponding to the tag name in the hash-table index 115. The tree index 116, as shown in FIG. 9, reflects the basic structure of the XML document and the Document Type Definition (DTD) associated with that XML document.

It should be observed that the hash table index 115 doesn't maintain the context of the tag elements whereas the tree index 116 does maintain the context of the tag elements. For example, referring to FIG. 9, two different area code elements are present, a phone area code 150 and a fax area code 160. The tree index 116 "recognizes" the different context of the two elements and indexes each of the two area code elements 150, 160 accordingly.

Referring back to FIG. 7, the query interpreter 106 takes the XQL tree 105, the hash-table index 115, the tree index 116, and the DOM representation of XML files as input and produces results 107 in the form of XML fragments. For queries that contain only simple path searches, the query interpreter 106 uses the tree index 116 to obtain desired DOM elements. When all the instances of a particular tag in an XML document need to be retrieved, the hash-table index 115 is used. The results 107 are the DOM elements that match the elements provided in the XQL query 103.

Figure 10:
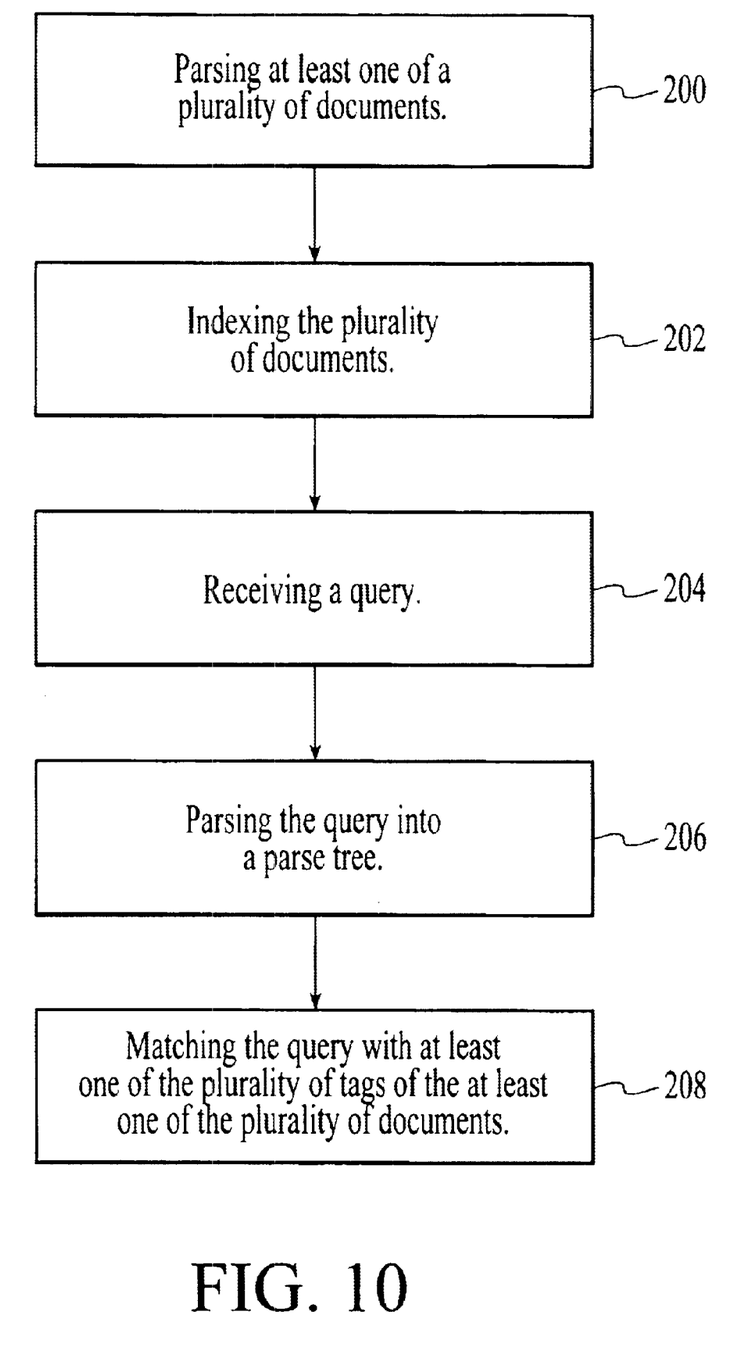
FIG. 10 is a flowchart of the operation in accordance with the present invention.

To better understand the operation of the preferred embodiment of a system and method in accordance with the present invention, please refer now to FIGS. 7 and 10. FIG. 10 is a flowchart of the operation in accordance with the present invention. The method begins by parsing at least one of a plurality of documents, via step 200. Preferably, these documents are XML documents that comprise a plurality of tags and this step involves the use of the XML4J parser that parses the XML document into a DOM 113 and parsed DTD 112. Next, the plurality of documents is indexed, via step 202. Steps 200 and 202 are preferably done to identify the plurality of tags present in each XML document. A query is then received, via step 204. Preferably, the query comprises a standardized XML-Query Language. Next, the query is parsed into a parse tree, via step 206. Finally, the query is then matched with at least one of the plurality of tags of the at least one of the plurality of documents, via step 208. This matching step preferably comprises the query interpreter matching the query 103 with the DOM elements 113 that conform to the path expression and the predicate expression given in the query 103.

The present invention facilitates context sensitive searches as well as comparative searches. Context sensitive searches focus on the context of a particular search string. For example, searching for "Albert Einstein" in a typical search engine will bring up colleges named after him, university lectures mentioning him, links to sites about him, solar folklore pages, pages of quotations, biographies of his colleagues, and so on. Utilizing the present invention, a web searcher can specify the context of the Albert Einstein search, i.e. the web searcher can specifically search for pages containing Albert Einstein as an author. The result of this context search will be pages that refer to Albert Einstein as an author.

Figure 11:
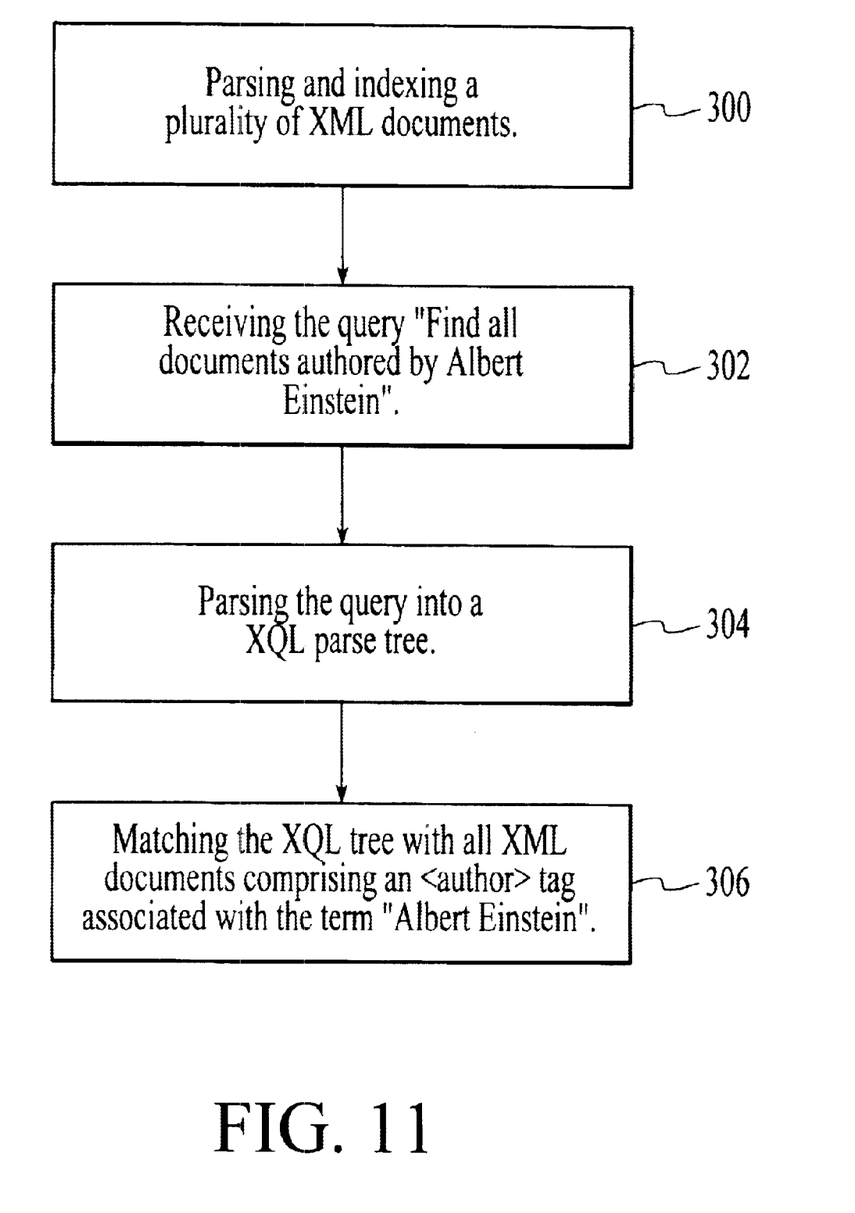
FIG. 11 is a flowchart of how the present invention performs a context search.

To further understand the concept of a context search of XML documents, please refer to FIG. 11. FIG. 11 is a flowchart of how the present invention performs a context search. First, the search engine parses and indexes the XML documents on the network, via step 300. Next, the query "Find all documents authored by Albert Einstein" is received, via step 302. The query is then parsed into an XQL tree, via step 304. Finally, the XQL tree is matched with all XML documents comprising an <author> tag associated with the term "Albert Einstein", via step 306. The subsequent result of this search is a listing of documents comprising information only related to Albert Einstein as an author.

The present invention also facilitates comparative searches. Comparative searches a involve the comparison of information from different areas of the network. For example, if a web searcher wants to find the cheapest book titled "An Introduction to XML". The search engine in accordance with the present invention will search the network for all <title> tags comprising "An Introduction to XML". The search engine will then access the <price> tag for each of the associated <title> tags and list the prices of each of the books entitled "An Introduction to XML".

Figure 12:
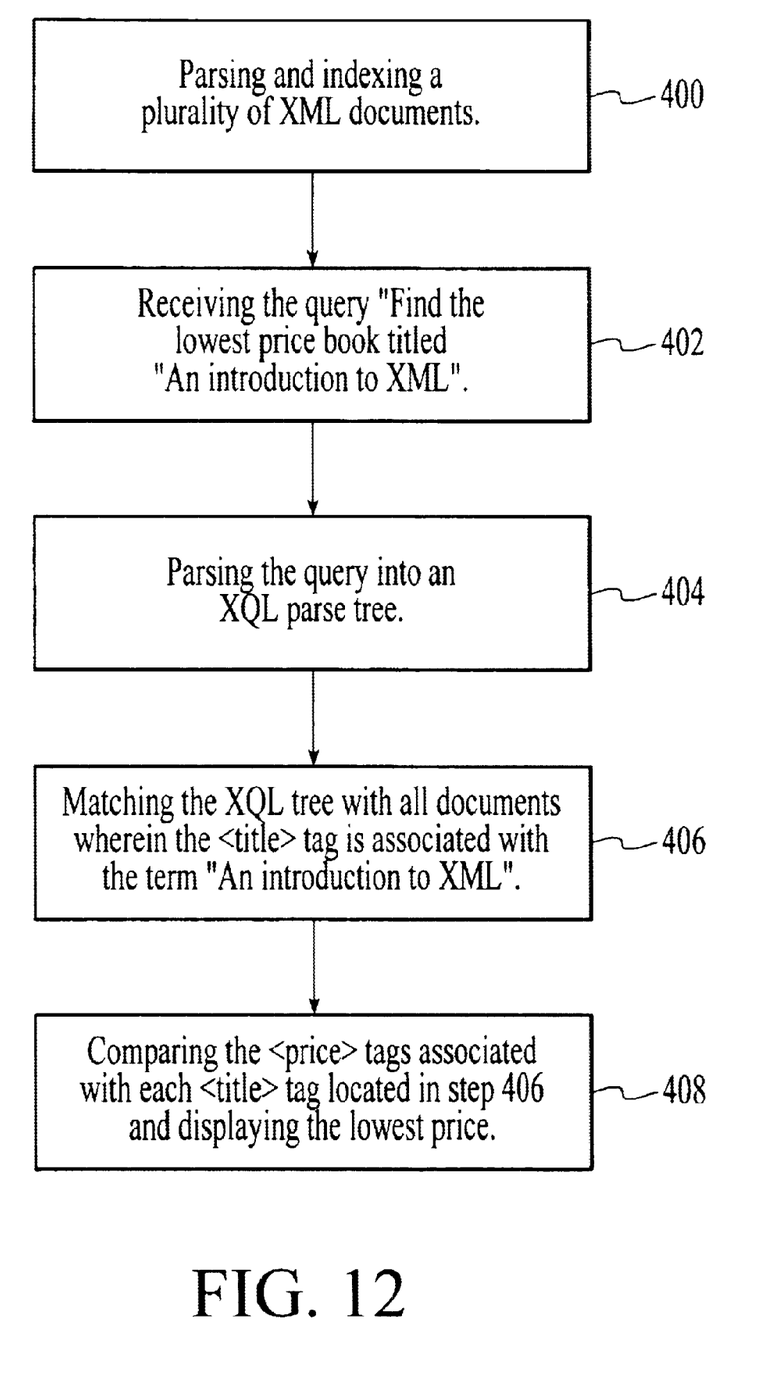
FIG. 12 is a flowchart of how the present invention performs a comparative search.

For a more detailed description of a comparative search of XML documents, please refer to FIG. 12. FIG. 12 is a flowchart of how the present invention performs a comparative search. First, the search engine parses and indexes the XML documents on the network, via step 400. Next, the query "Find all the lowest price of the book titled 'An Introduction to XML'" is received, via step 402. The query is then parsed into a XQL tree, via step 404. The XQL tree is then matched with all the documents wherein the <title> tag is associated with the term "An Introduction to XML", via step 406. Finally, the <price> tag(s) associated with each <title> tag located in step 406 are compared and the lowest price is displayed, via step 408.

Through the use of the method and system in accordance with the present invention, the extraction of information from networks comprising XML documents is done in a more precise fashion. Accordingly, once the XML format becomes more standardized, the present invention can be effectively utilized to improve web searches and get fewer and more relevant results.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for conducting a search on a network, the network having a plurality of sites, one or more of the plurality of sites having a plurality of XML documents, wherein at least one of the plurality of XML documents comprises a plurality of tags, the method comprising the steps of:

a) parsing the at least one of the plurality of XML documents into a tree index and a hash-table index, wherein the tree index and the hash-table index comprise pointers to XML elements in a document object model representation of the at least one of the parsed XML documents, and wherein the hash-table index comprises pointers to XML elements with the same name;

b) receiving a query;

c) parsing the query into an XQL tree; and d) matching the XQL tree with at least one of the plurality of tags of the at least one of the plurality of XML documents using the document object model representation, the tree index, and the hash-table index.

2. The method of claim 1 wherein the network comprises the Internet.

3. The method of claim 1 wherein the search comprises a context search.

4. The method of claim 1 wherein the search comprises a comparative search.

5. A system for conducting a search on a network, the network having a plurality of sites, one or more of the plurality of sites having a plurality of XML documents, wherein at least one of the plurality of XML documents comprises a plurality of tags, the system comprising:

means for parsing the at least one of the plurality of XML documents into a tree index and a hash-table index, wherein the tree index and the hash-table index comprise pointers to XML elements in a document object model representation of the at least one of the parsed XML documents, and wherein the hash-table index comprises pointers to XML elements with the same name;

means for receiving a query;

means for parsing the query into an XQL tree; and means for matching the XQL tree with at least one of the plurality of tags of the at least one of the plurality of XML documents using the document object model representation, the tree index, and the hash-table index.

6. The system of claim 5 wherein the means for parsing the at least one of the plurality of XML documents comprises an XML parser.

7. The system of claim 5 wherein the means for matching further comprises a query interpreter.

8. The system of claim 5 wherein the network comprises the Internet.

9. The system of claim 5 wherein the search comprises a context search.

10. The system of claim 5 wherein the search comprises a comparative search.

11. A computer readable medium containing program instructions for conducting a search on a network, the network having a plurality of sites, one or more of the plurality of sites having a plurality of XML documents, wherein at least one of the plurality of XML documents comprises a plurality of tags, the program instructions comprising the steps of:

a) parsing the at least one of the plurality of XML documents into a tree index and a hash-table index, wherein the tree index and the hash-table index comprise pointers to XML elements in a document object model representation of the at least one of the parsed XML documents, and wherein the hash-table index comprises pointers to XML elements with the same name;

b) receiving a query;

c) parsing the query into an XQL tree; and d) matching the XQL tree with at least one of the plurality of tags of the at least one of the plurality of XML documents using the document object model representation, the tree index, and the hash-table index.

12. The computer readable medium of claim 11 wherein the network comprises the Internet.

13. The computer readable medium of claim 11 wherein the search comprises a context search.

14. The computer readable medium of claim 11 wherein the search comprises a comparative search.

* * * * *